(12) United States Patent
Kaushik et al.

(10) Patent No.: US 7,865,627 B2
(45) Date of Patent: Jan. 4, 2011

(54) FIBRE CHANNEL FABRIC SNAPSHOT SERVER

(75) Inventors: Balakumar N. Kaushik, Sunnyvale, CA (US); Shankar Balasubramanian, Sunnyvale, CA (US); Richard L. Hammons, Hollister, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 12/576,039

(22) Filed: Oct. 8, 2009

(65) Prior Publication Data

US 2010/0088481 A1   Apr. 8, 2010

Related U.S. Application Data

(60) Continuation of application No. 11/457,744, filed on Jul. 14, 2006, now Pat. No. 7,620,742, which is a division of application No. 10/425,559, filed on Apr. 29, 2003, now Pat. No. 7,139,845.

(51) Int. Cl.
G06F 3/00 (2006.01)
G06F 11/00 (2006.01)
G06F 12/00 (2006.01)

(52) U.S. Cl. ............... 710/5; 710/20; 707/204; 714/40; 714/41; 714/42; 711/100; 711/161

(58) Field of Classification Search ............... None
See application file for complete search history.

(56) References Cited

U.S. PATENT DOCUMENTS 6,883,073 B2    4/2005  Arakawa et al.
6,944,732 B2    9/2005  Thunquest et al.
6,981,114 B1   12/2005  Wu et al.
7,620,742 B2 * 11/2009  Kaushik et al. ................. 710/5
2001/0047482 A1 * 11/2001  Harris et al. ................. 713/200

\* cited by examiner

*Primary Examiner*—Alan Chen
(74) *Attorney, Agent, or Firm*—Wong, Cabello, Lutsch, Rutherford & Brucculeri LLP (57) ABSTRACT

The snapshot capability moving into the SAN fabric and being provided as a snapshot service. A well-known address is utilized to receive snapshot commands. Each switch in the fabric connected to a host contains a front end or service interface to receive the snapshot command. Each switch of the fabric connected to a storage device used in the snapshot process contains a write interceptor module which cooperates with hardware in the switch to capture any write operations which would occur to the snapshot data area. The write interceptor then holds these particular write operations until the original blocks are transferred to a snapshot or separate area so that the original read data is maintained. Should a read operation occur to the snapshot device and the original data from requested location has been relocated, a snapshot server captures these commands and redirects the read operation to occur from the snapshot area. If, however, the read operation is directed to the original drive, the read is provided from the original data areas, even if the data had been replaced. The snapshot server determines the existence of particular snapshot devices, allocates their storage locations, provides this information to both the service interfaces and the write interceptors and handles read and write operations to the snapshot device.

18 Claims, 9 Drawing Sheets

FIBRE CHANNEL FABRIC SNAPSHOT SERVER

CROSS REFERENCE TO RELATED APPLICATIONS

This application is a continuation application of U.S. patent application Ser. No. 11/457,744, filed Jul. 14, 2006, which is a division application of U.S. patent application Ser. No. 10/425,559, filed Apr. 29, 2003, now U.S. Pat. No. 7,139,845, both of which are incorporated by reference in their entirety, and to which priority is claimed. This application is related to U.S. patent applications Ser. Nos. 11/457,737, entitled "Service Interface for Fibre Channel Fabric Snapshot Service," now U.S. Pat. Nos. 7,571,261; 11/457,757, entitled "Fabric With Fibre Channel Fabric Snapshot Service," now U.S. Pat. Nos. 7,392,328; and 11/457,768, entitled "Network With Fibre Channel Fabric Snapshot Service," now U.S. Pat. No. 7,516,245, all of which are divisionals of Ser. No. 10/425,559.

BACKGROUND OF THE INVENTION

1. Field of the Invention

The invention relates to networks, more particularly to storage area networks (SANs) and yet more particularly to creating snapshots of data on the SAN.

2. Description of the Related Art

Storage Area Networks (SANs) are becoming more common as a means to lower storage costs and increase storage efficiency while increasing storage flexibility. One common function in an SAN is to copy data from one storage device to another, such as during a backup operation. However, performing the backup operation in the SAN is actually relatively difficult, as the SAN is usually running 7/24, so the particular storage units can never be stopped or taken off line to perform the backup. Further, as a SAN often has tera bytes of data, a backup operation is a time consuming process as well. Because the storage devices cannot be taken off line and the backup takes a long time, snapshotting has been developed.

In a snapshot, the data present in the storage unit is captured or snapshotted at the particular instant in time and remains separated from any further data which is written to the storage device. Thus an operation such as backing up can read from the shapshot, while write operations can occur to the particular device, with a write database keeping track of blocks stored to an alternate location to preserve the older data for the snapshot read.

In the past, two different approaches for providing the snapshot functionality have existed. In the first, the functionality is provided in the storage device itself, so that when it receives a snapshot command, it redirects new write data to a new snapshot area on the storage device so that the old data is preserved for snapshot device reads. While this does provide the functionality, it limits the operation to occurring within the particular storage device, thus not allowing spanning across storage devices as a logical unit, as is commonly done in a SAN. The second approach to snapshotting occurred in the host, with host software running to perform the write capture operations which are necessary for snapshot operations. Again, this is a relatively limiting situation in that other hosts could readily access the storage device and thus completely bypass the snapshot operation. So either the software has to be resident on every host, which is problematic by itself, and further complicated by the need for the hosts to communicate, or the storage device must be limited to access only by a particular host computer. Both of these operations are complicated and are contrary to the general development of SANs. Therefore, it is desirable that a much more flexible method be developed to provide snapshot capability in a SAN which is neither storage device nor host limited.

BRIEF SUMMARY OF THE INVENTION

In embodiments according to the present invention, the snapshot capability is moved into the SAN fabric and provided as a snapshot service. A well-known address is utilized to receive snapshot commands from the hosts. Each switch in the fabric connected to a host contains a front end or service interface. The service interface of the switch connected to the host receives the snapshot command.

Each switch of the fabric connected to a storage device used in the snapshot process contains a write interceptor module which cooperates with hardware in the switch to capture any write operations which would occur to the snapshot data area. The write interceptor then holds these particular write operations until the original blocks are transferred to a snapshot or separate area so that the original read data is maintained. After the blocks have been saved, the write operation occurs. These relocated blocks and any remaining original blocks form the snapshot device. Should a read operation occur to the snapshot device and the original data from requested location has been relocated, a snapshot server will capture these commands and redirect the read operation to occur from the snapshot area. If, however, the read operation is directed to the original drive, the read would be provided from the original data areas, even if the data had been replaced.

Both the service interface and the write interceptor modules cooperate with the snapshot server for management purposes. The snapshot server determines the existence of particular snapshot devices, allocates their storage locations, provides this information to both the service interfaces and the write interceptors and handles read and write operations to the snapshot device.

Therefore, the switches present in the fabric itself, along with a snapshot server, provide the snapshotting functionality. This is transparent to any host or storage device and can be utilized by multiple hosts and across multiple, non-identical storage devices.

DETAILED DESCRIPTION OF PREFERRED EMBODIMENT

Figure 1:
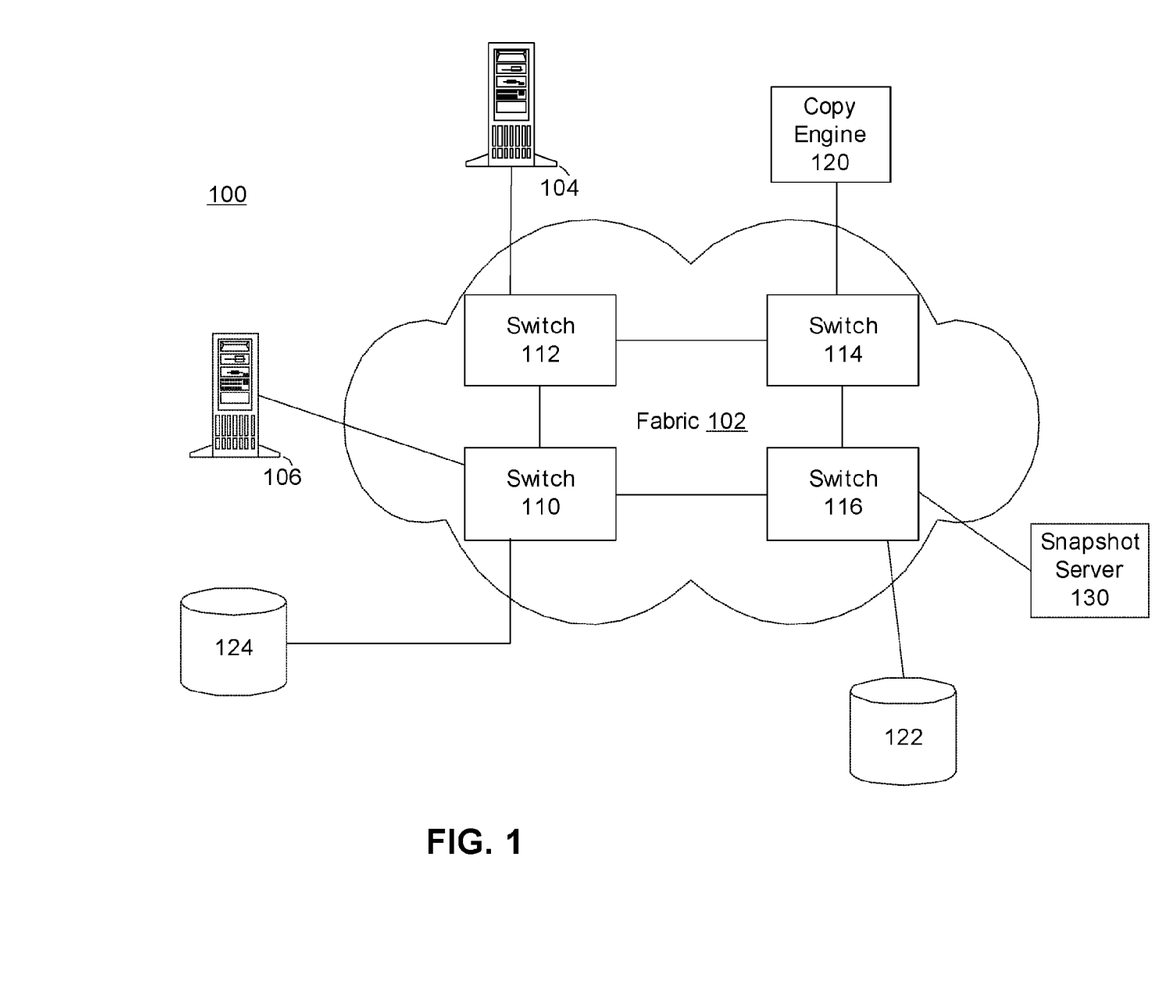
FIG. 1 is a block diagram of an exemplary network including a SAN according to the present invention.

Referring now to FIG. 1, a Fibre Channel network 100 is illustrated. Generally, the network 100 is connected using Fibre Channel connections (e.g., optical fiber and coaxial cable). In the embodiment shown and for illustrative purposes, the network 100 includes a fabric 102 comprised of four different switches 110, 112, 114, and 116. It will be understood by one of skill in the art that a Fibre Channel fabric may be comprised of one or more switches. Two hosts 104 and 106 are connected to the fabric 102, and more particularly to switches 114 and 112. Additionally, a copy engine 120 is connected to switch 114. The copy engine 120 may be an independent device or a part of a larger device such as a tape unit or storage router. Storage devices 122 and 124 are connected to the fabric 102, specifically to switches 110 and 116. The storage devices 122 and 124 can be any type of storage device, such as a RAID array, a JBOD unit or a tape unit. A snapshot server 130 is connected to switch 116 and performs snapshot management as described below.

Figure 2:
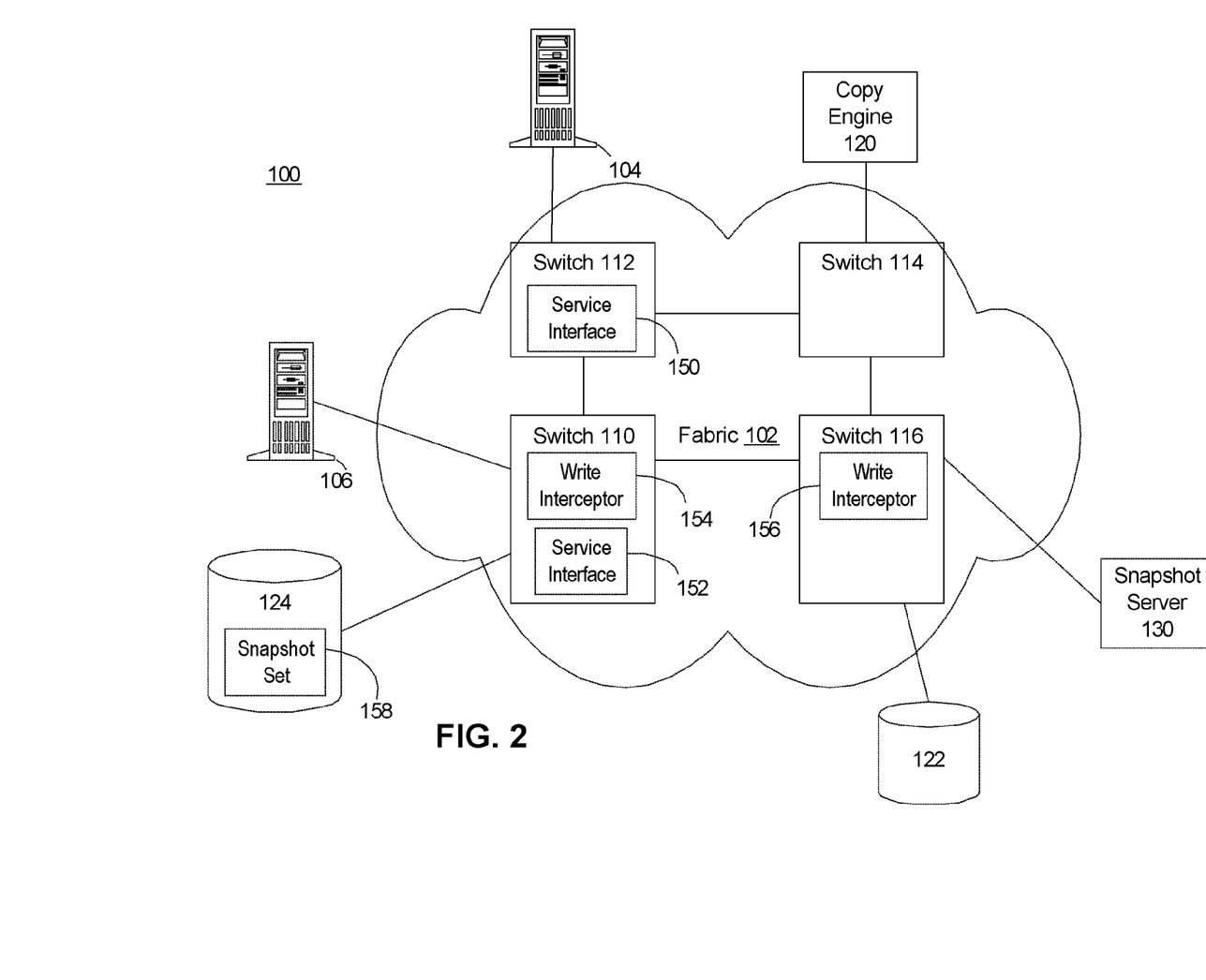
FIG. 2 is a more detailed view of the network of FIG. 1 illustrating the locations of the service interfaces, write interceptors, and snapshot set.

Referring now to FIG. 2, the switches 110, 112 are shown including service interfaces 150 and 152 according to the present invention. Each of the service interfaces 150, 152 responds to the well-known address FFFF FFFD or fabric controller address, and specifically to LUN 12 of that controller. Thus, should any host 104 or 106 desire to use the snapshot capability of the fabric 102, it provides a snapshot command to LUN 12 at address FFFF FFFD. The snapshot command is a new command which includes the information necessary to create the snapshot, such as the desired size, locations to be captured and lifetime. A service interface is present in at least all switches connected to hosts and could be present in all switches, if desired.

The switches 110 and 116 are shown including write interceptors 154 and 156 according to the present invention. Each write interceptor 154, 156 is used to handle writes to the original data set. Also shown is a snapshot set 158 in storage device 124. The snapshot set 158 is the copied original data associated with the particular snapshot device. The original data set for the particular snapshot device could be located on either storage device 122 or storage device 124 according to the preferred embodiment.

Figure 3:
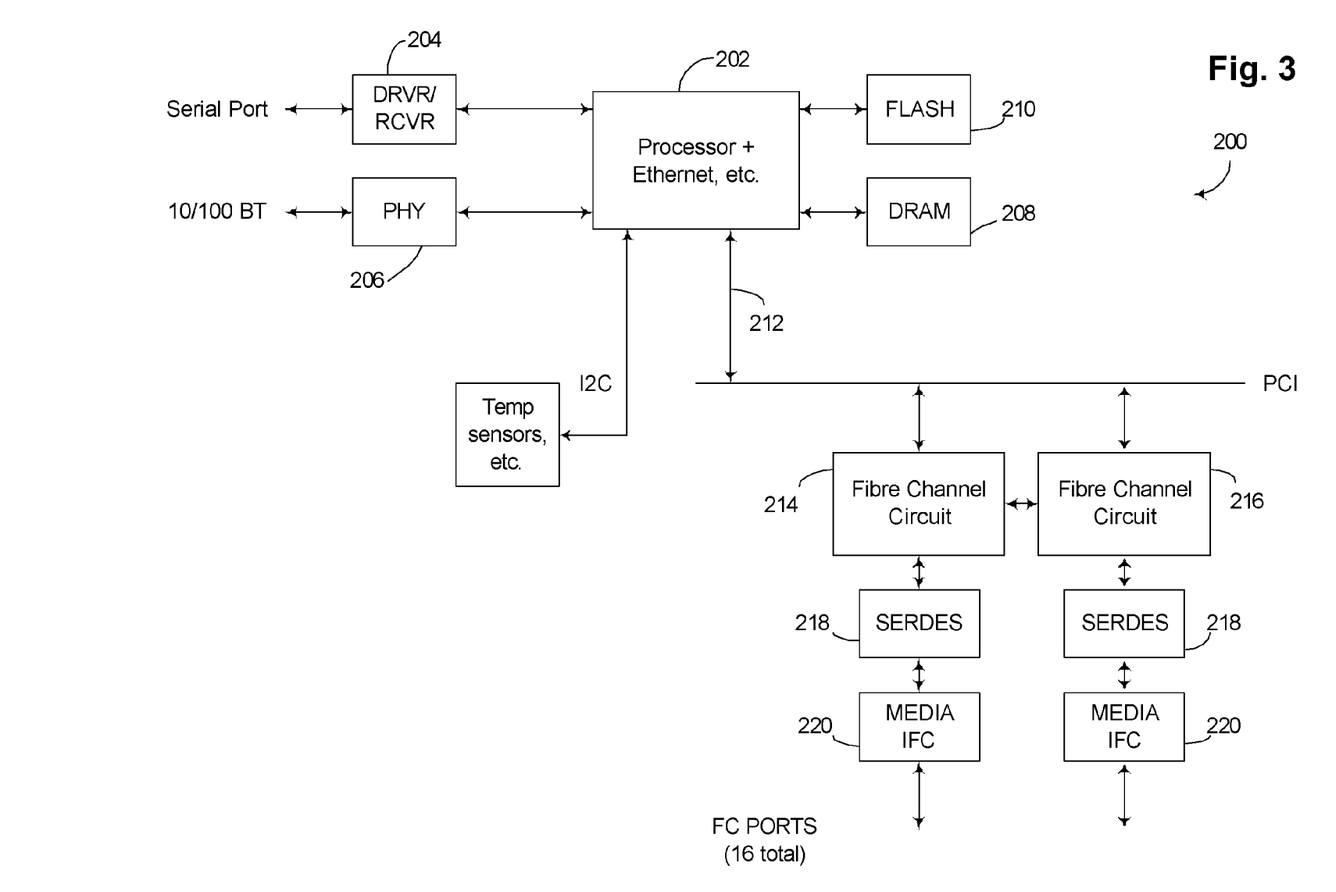
FIG. 3 is a block diagram of an exemplary switch.

FIG. 3 illustrates a basic block diagram of a switch 200, such as switches 110, 112, 114, or 116 according to the preferred embodiment of the present invention. A processor and I/O interface complex 202 provides the processing capabilities of the switch 200. The processor may be any of various suitable processors, including the Intel i960 and the Motorola or IBM PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210, are connected to the processor complex 202 to provide memory to control and be used by the processor.

The processor complex 202 also includes an I/O bus interface 212, such as a PCI bus, to connect to Fibre Channel circuits 214 and 216. The Fibre Channel circuits 214, 216 in the preferred embodiment each contain eight Fibre Channel ports. Each port is connected to an external SERDES circuit 218, which in turn is connected to a media interface 220, which receives the particular Fibre Channel medium used to interconnect switches used to form a fabric or to connect to various devices.

Figure 4:
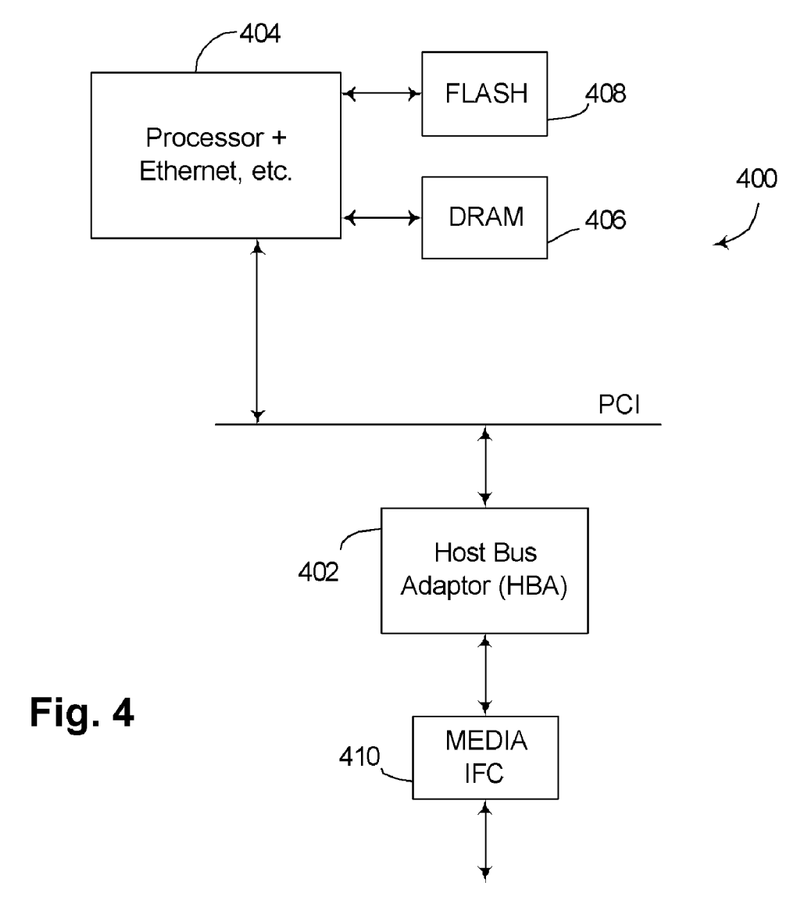
FIG. 4 is a block diagram of an exemplary snapshot server.

Referring now to FIG. 4, a block diagram of a simple snapshot server 400 is shown. A host bus adapter (HBA) 402 is connected to a processor and I/O interface complex 404. DRAM 406 and FLASH ROM 408 are connected to the processor 404 to provide working memory and program storage. A media interface 410 is connected to the HBA 402. The snapshot server 400 will interact with the service interfaces, write interceptors and hosts. The design of a simple copy engine is identical to the copy snapshot server 400.

As can be seen, the block diagrams of a switch 200, the copy engine and the snapshot server 400 are similar, so that the software required to perform the copy engine or snapshot server functionality can be added to the switch 200, preferably along with additionally RAM to allow more buffer storage space, provided sufficient processor throughput is available. If not, processor performance can be increased as necessary.

Figure 5:
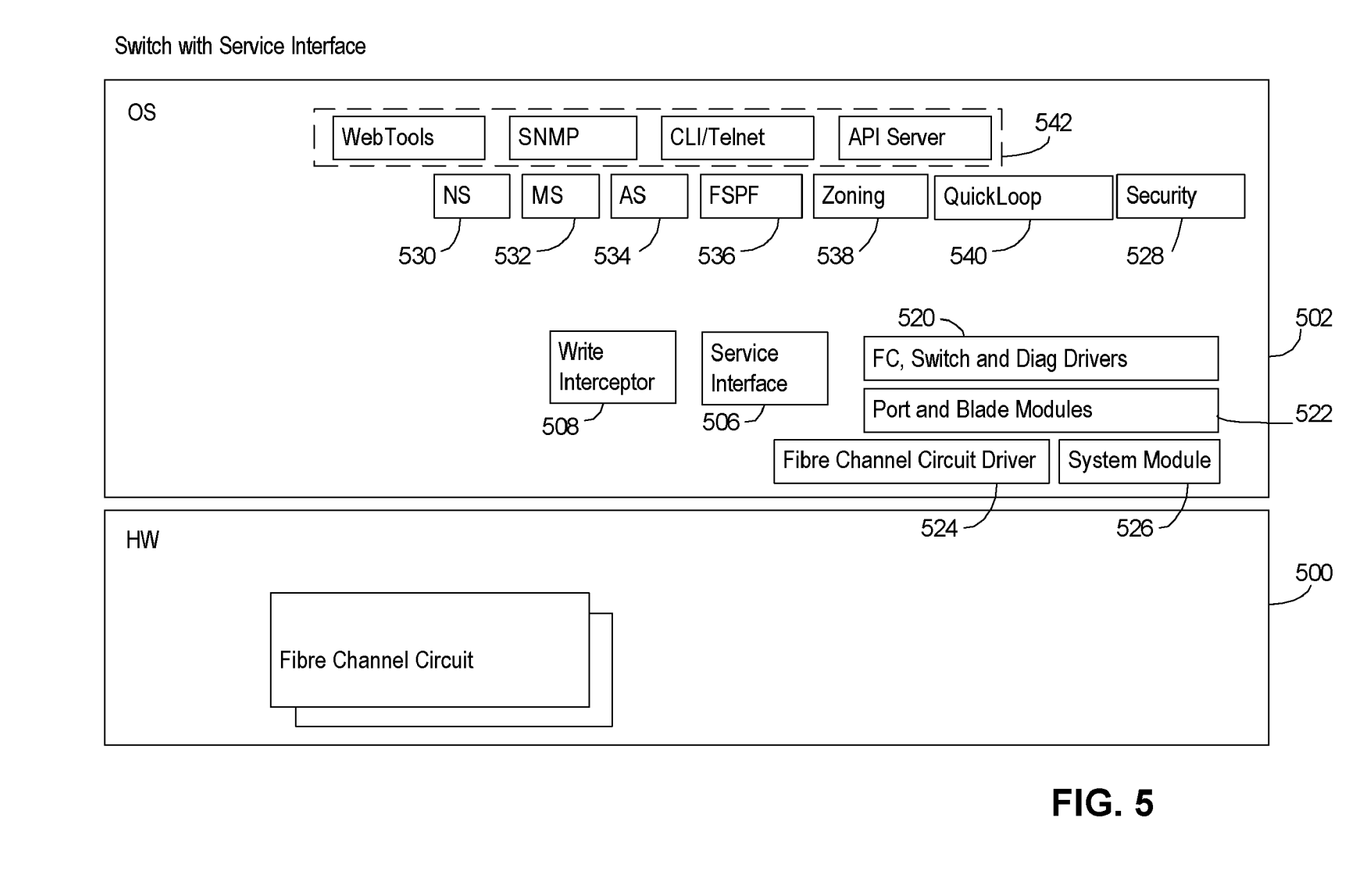
FIG. 5 is a software diagram of a switch including a service interface and write interceptor according to the present invention.

Proceeding then to FIG. 5, a general block diagram of the switch 110-116 hardware and software is shown. Block 500 indicates the hardware as previously described. Block 502 is the basic software architecture of the switch 110-116. Generally think of this as the switch operating system and all of the particular modules or drivers that are operating within that embodiment. A service interface module 506 provides the service interface functionality described above and below. A write interceptor module 508 provides the write interception functionality described above and below. Other modules operating on the operating system 502 are Fibre Channel, switch and diagnostic drivers 520; port modules 522, if appropriate; a driver 524 to work with the Fibre Channel circuits; and a system module 526. In addition, because this is a fully operational switch, the normal switch modules for switch management and switch operations are generally shown. These other switch modules include a QuickLoop module 540 to handle private-public address translations, a zoning module 538, an FSPF or Fibre Shortest Path First routing module 536, an AS or alias server module 534, an MS or management server module 532, a name server module 530 and a security module 528. Additionally, the normal switch management interface 542 is shown including web server, SNMP, telnet and API modules.

Figures 6, 7:
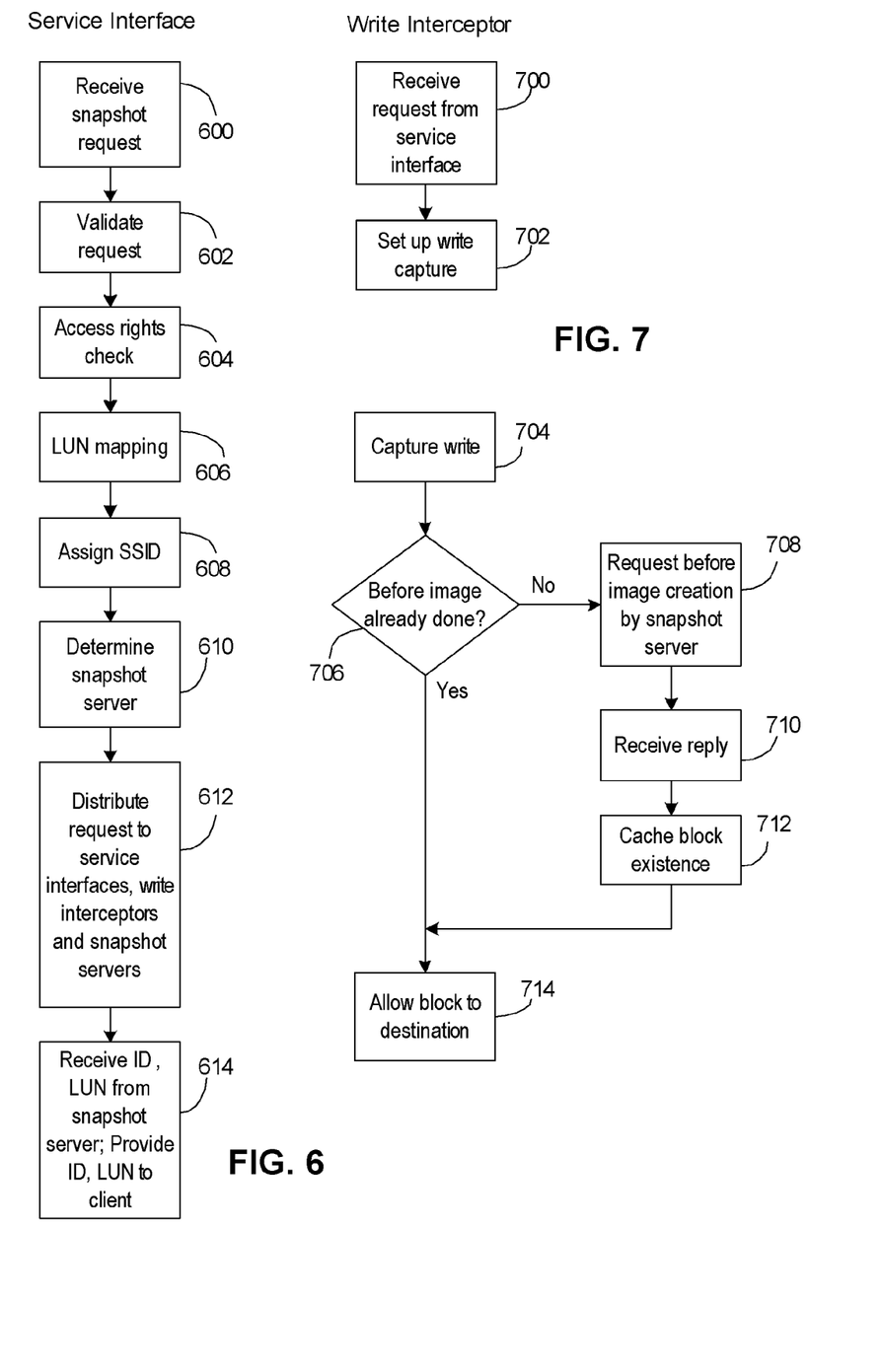
FIG. 6 is a flowchart of operations for a service interface according to the present invention receiving a snapshot request.
FIG. 7 is a flowchart of operations for a write interceptor according to the present invention setting up a snapshot and capturing write operations as they occur.

Referring now to FIG. 6 the operation of the service interface when receiving a snapshot creation request is shown. In step 600 the service interface receives the snapshot creation request from the host computer. The request is validated in step 602 and access rights are checked in step 604. Thus these two steps 602 and 604 verify that the request is in the proper format, that the particular host has the authority and that the various zoning and access rights are available. In step 606 the service interface performs the appropriate LUN mapping so that transformations can occur between the host and the storage devices. In step 608 the service interface assigns a snapshot ID (SSID) to allow all devices to keep track of this particular snapshot. In step 610 the service interface determines the particular snapshot server to be utilized for this operation. If there is just one snapshot server, this is a simplified step. However, if there are multiple snapshot servers in the network, the service interfaces can interoperate to load balance the snapshot servers. In step 612 the snapshot creation request is distributed to all of the other service interfaces, to the write interceptors and to the snapshot servers in the network. This allows the other service interfaces to track to snapshot and SSID values. This allows the write interceptors to setup their write captures and allows the snapshot server to create the snapshot. In step 614, the destination ID or World Wide Name (WWN) of the snapshot server and LUN provided by the snapshot server are forwarded to the host so that it knows how to properly address the snapshot device.

The operation of the write interceptor is shown in FIG. 7. In step 700 the write interceptor receives a request from the service interface to set up a snapshot for a particular DID and LUN, which is the DID and LUN of the original data set. The write interceptor in step 702 causes the frame filtering hardware in the switch to set up the particular write capture. In the preferred embodiment the write interceptor is executing on a switch that includes hardware capability for frame filtering, such as that present in Silkworm 3200, 3800, and 12000 from Brocade Communications Systems, Inc. More details of the frame filtering are provided in U.S. application Ser. No. 10/123,996 for "FIBRE CHANNEL ZONING BY DEVICE NAME IN HARDWARE" by Ding-Long Wu, David C. Banks and Jieming Zhu, filed Apr. 17, 2002, which is hereby incorporated by reference. Sometime after the write filter has been set up in step 702, it is assumed that a write operation to the original data set capture is captured at step 704. Control proceeds to step 706 to determine if a before image has already been made by the snapshot server for this particular block. If not, in step 708 a request is provided to the snapshot server to request a before image creation of this particular block. After creation by the snapshot server in step 708, a reply is received in step 710 and the existence of the block is cached in step 712 for further checking in later instances of step 706. If the image has already been created, or after caching, the block is allowed to proceed to the destination indicated in the particular frame in step 714. Thus the original data set is altered, but the original data will have been copied to the snapshot device.

The operation of the snapshot server is shown in FIGS. 8A, 8B, 8C and 8D. Operation commences at step 800 in FIG. 8A where the snapshot server receives the snapshot creation request from the service interface. In step 802, the snapshot server creates an alias group including just the snapshot server so that an alternate snapshot server can be easily used in case of failure of the first snapshot server. The snapshot server then requests an allocation of the snapshot space in step 804. In step 806, the snapshot server returns its ID and the LUN assigned to the snapshot device to the service interface. Thus the particular space needed for the snapshot device is developed. Preferably this is done from an allocated pool and could be shared between multiple snapshot servers if desired.

Figures 8A, 8B, 8D:
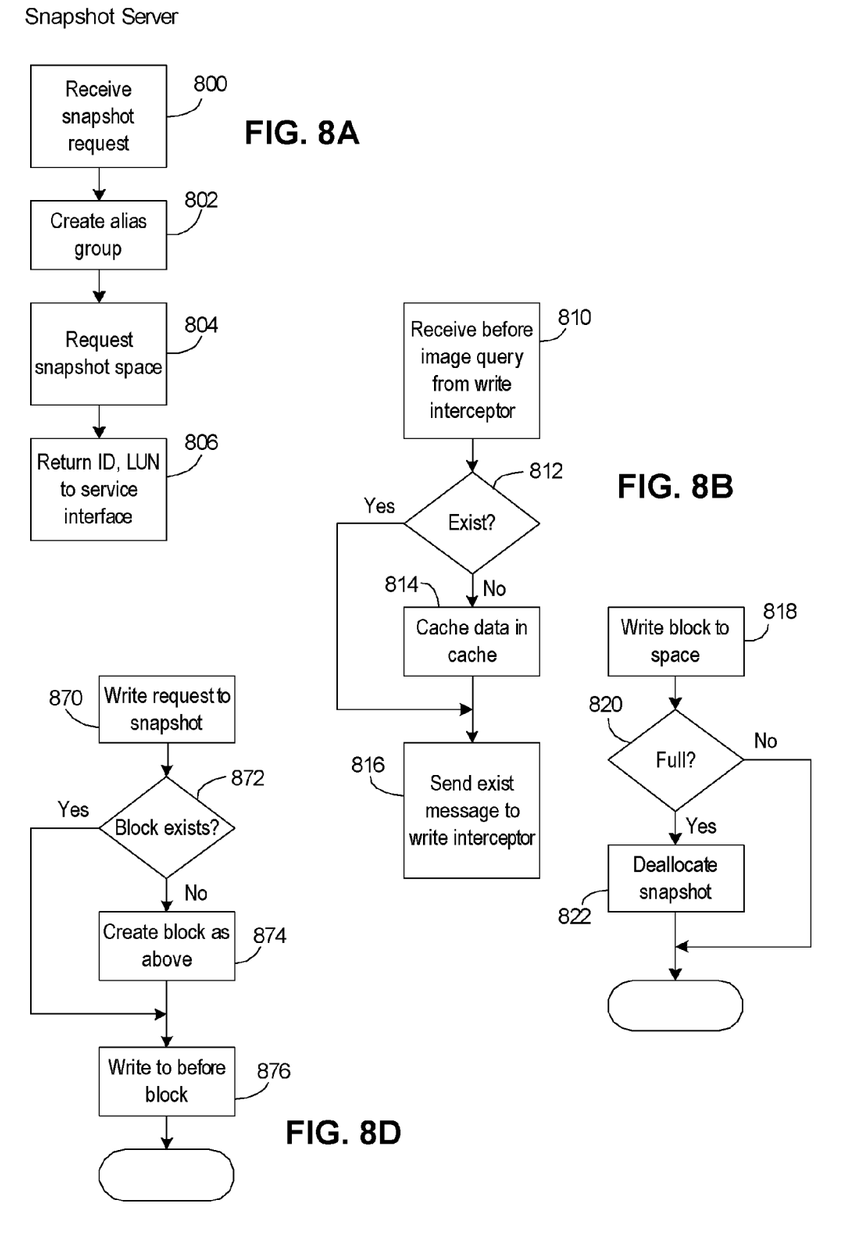
FIGS. 8A, 8B, 8C, and 8D are flowcharts of operation of a snapshot server to create a snapshot device, to manage the development of snapshot space and to handle reads and writes to the snapshot device.

In FIG. 8B, at step 810, the snapshot server receives an image query from step 708 of the write interceptor. In step 812 the snapshot server determines if a particular before image exists. If not, the data for that particular before image block is cached in step 814. After caching or if it previously existed, control proceeds to step 816 to provide a message to the write interceptor that the block or the before image exists. In a background and parallel operation in step 818 the block that had been cached in step 814 is written to the snapshot space provided in step 804. In step 820 a determination is made whether the snapshot space is full. If so, this is irrecoverable and the entire snapshot is deallocated in step 822. The operation completes after step 820 if it is not full or after step 822.

Figure 8C:
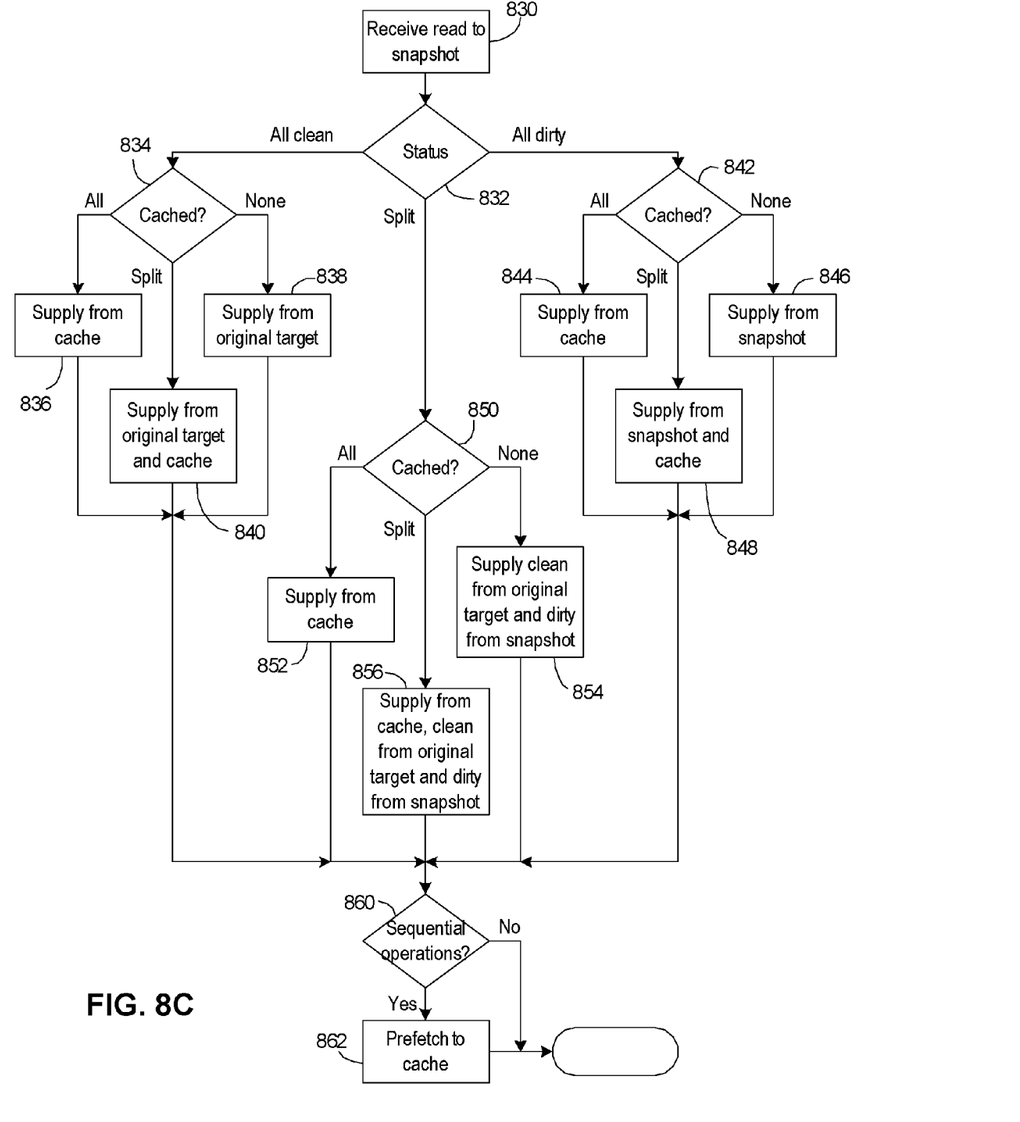

In FIG. 8C a read request is received by the snapshot server from a host directed to the snapshot device by the snapshot server in step 830. Thus the snapshot server is acting as a virtual storage device for the snapshot device. In step 832 the status of that particular block is checked. There are three alternatives here: all clean, all dirty, or split, which is partially clean and partially dirty. Clean means that the data in the original data set has not been changed. Dirty indicates that the original data set has been changed by prior write operations. If the entire block is clean, control proceeds to step 834 to determine if portions of the block are cached. Preferably, the snapshot server 400 provides a large data cache to improve overall performance.

If all of the block is cached, then in step 836 the requested data is provided from the cache. If none of the block is cached, then in step 838 the original target device is requested to supply the data from the original data set. The snapshot server appropriately modifies the frame to point to the proper locations on the original storage device, including changing the DID, LUNs and other necessary fields and provides the frame to the device. The frame can be modified to either have the data returned directly to the host or it can be provided through the snapshot server, though this is less desirable. If it is a split situation, then in step 840 data is provided from both the original target and the cache and merged together as appropriate.

If all of the data is dirty, i.e., indicating that new write data has been provided for all of the blocks, control proceeds to step 842 to determine if the data is cached. If all of it is cached, then in step 844 the data is supplied from the cache. If none of it is cached, then in step 846 the data is provided from the snapshot device. Here again, the snapshot server appropriately modifies the frame. If it is a split situation, in step 848 the data is retrieved from the cache and the snapshot device and merged for the full request.

If in step 832 it is determined that the block is split between clean and dirty, control proceeds to step 850 to determine if any of the data is cached. If all of the data is cached, it is simply provided from the cache in step 852. If none of the data is present in the cache, then the clean data is provided from the original data set, the dirty data is provided from the snapshot device and they are merged in step 854. If part of the data is present in the cache, then in step 856 that data is provided from the cache, any further clean data is provided from the original data set and any further dirty data is provided from the snapshot device.

After the data is provided, control proceeds to step 860, where the snapshot server determines if sequential operations have been occurring. If not, operation of the sequence terminates. If yes, then in step 862 the snapshot server proceeds to prefetch some data into the cache to allow future operations to be more efficient.

It is also possible to write to the snapshot device and that is shown in FIG. 8D. In step 870 the write request to the snapshot device is received by the snapshot server. It determines if the block exists in step 872 and if not, the copied block is created as above in step 874. After the block has been created or if it already exists, in step 876 the data is written to the before image block in the snapshot device, but the original data set is unchanged.

Figure 9A:
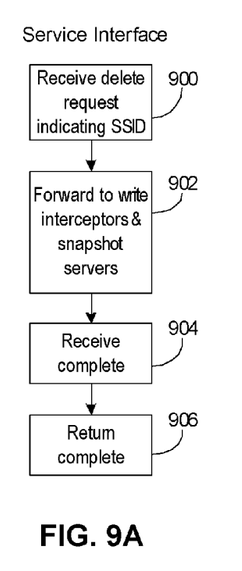
FIGS. 9A, 9B, and 9C are flowcharts of operations of the service interface, write interceptor, and snapshot service deleting a snapshot device.
Figure 9B:
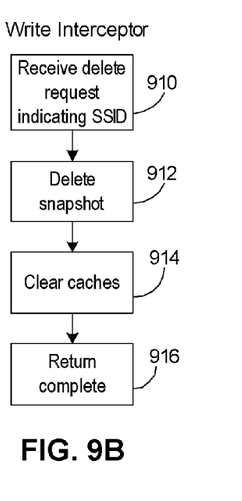
Figure 9C:
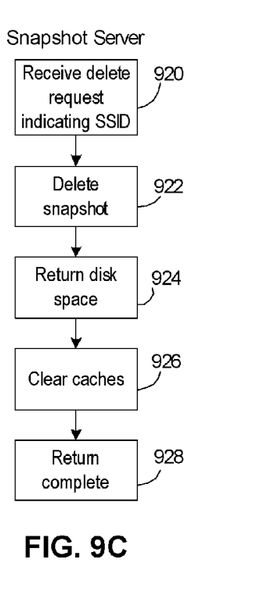

One operation that may occur is the deletion of a snapshot device, for example after the particular backup operation has been completed. The responses of the service interface, write interceptor and snapshot server are shown in FIGS. 9A, 9B and 9C, respectively. In step 900 a service interface receives the delete request. This is forwarded in step 902 to the write interceptors and snapshot servers. Eventually each of these return complete in step 904 and in step 906 the service interface returns complete to the host requesting the deletion. The write interceptor receives the delete request from the service interface in step 910. In step 912 it deletes the particular snapshot and associated write filters and in step 914 clears any of its caches. Step 916 returns complete to the service interface. The snapshot server in step 920 will also receive the delete request from the service interface. In step 922 the snapshot server deletes the snapshot and in step 924 returns the disk space for further use. Caches are cleared in step 926 and a return complete is provided to the service interface in step 928.

Figure 10A:
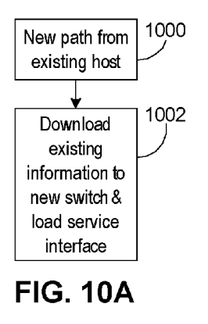
FIGS. 10A and 10B are flowcharts of operations of the service interface and write interceptor when a new target is connected to a switch or a new switch is connected to a target.
Figure 10B:
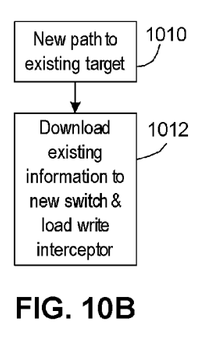

In certain cases a new switch can be connected to an existing target or host. The service interface and write interceptor operations in these cases are shown in FIGS. 10A and 10B. In step 1000 a service interface determines that a new path from an existing host has developed. In step 1002 the service interface is loaded on that particular switch, if necessary, and all the existing information in the fabric related to the particular snapshots are provided to that service interface. In step 1010 a switch determines that a new path to an existing target has developed. In this case the write interceptor module is loaded, if necessary, and the existing information is downloaded into that switch in step 1012.

Figure 11A:
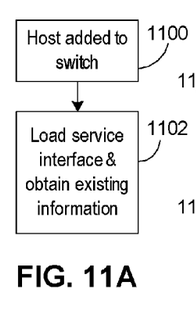
FIGS. 11A and 11B are flowcharts of operations of the service interface and write interceptor when a new switch is added to a host or a host is added to a new switch.
Figure 11B:
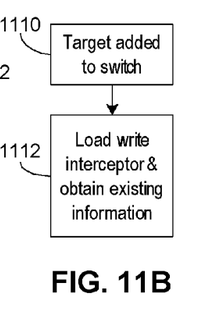

As Fibre Channel SANs are hot plug networks, it is also common that a target or a host be added to a particular switch. This is shown in FIGS. 11A and 11B. In step 1100 a host is added to a particular switch. In step 1102, if the service interface is not already present, it is loaded and existing information about snapshots in the particular fabric are provided to that switch. In step 1110, it is determined that a target has been added to a switch. If the write interceptor is not present it is loaded in step 1112 and obtains information about the snapshots present in the fabric.

As noted above, the service interface module and the write capture module can be executing in the same switch. In that case, any communications between those two instances is by an interprocess call, with Fibre Channel frames being used with any service interface modules or write capture modules in any other switches. Similarly, if the snapshot server I sin the same switch with either a service interface module, a write capture module or both, those communications are also done by interprocess calls.

Thus a snapshot service has been provided as a fabric service. Specialized host software or storage devices are not required and snapshots can be created across multiple storage devices.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

The invention claimed is:

1. A network device, comprising:
    at least one port for coupling to a host, an original storage device and a snapshot storage device;
    a first module coupled to said at least one port for creating a snapshot of data stored on the original storage device; and
    a second module coupled to said at least one port and said first module for receiving a read request provided by the host and for responding to said request with response data that includes original storage device data if unmodified data is requested and snapshot storage device data if modified data is requested.

2. The network device of claim 1, further comprising:
    a cache memory coupled to said at least one port and said second module for storing storage device data;
    wherein the response data which includes a request for unmodified data includes cached storage device data corresponding to the original storage device data if the corresponding original storage device data is stored in said cache memory and original storage device data if corresponding storage device data is not stored in said cache memory.

3. The network device of claim 2, wherein said second module further determines if sequential read request operations are being performed and prefetches data and stores said prefetched data in said cache memory if sequential read request operations are being performed.

4. The network device of claim 1, further comprising:
    a cache memory coupled to said at least one port and said second module for storing snapshot storage device data;
    wherein the response data which includes a request for modified data includes cached snapshot data corresponding to the snapshot storage device data requested if the corresponding snapshot data is stored in said cache memory and snapshot storage device data if corresponding snapshot data is not stored in said cache memory.

5. The network device of claim 4, wherein the response data which includes a request for unmodified data includes cached storage device data corresponding to the original storage device data if the corresponding original storage device data is stored in said cache memory and original storage device data if corresponding storage device data is not stored in said cache memory.

6. The network device of claim 5, wherein said second module further determines if sequential read request operations are being performed and prefetches data and stores said prefetched data in said cache memory if sequential read request operations are being performed.

7. The network device of claim 1, wherein said at least one port is further for coupling to a service interface device and wherein said first module creates the snapshot in response to a command received from the service interface device.

8. The network device of claim 1, wherein said at least one port is further for coupling to a write capture device and wherein the network device further comprises a third module for caching data written to said original storage device as provided to the network device by the write capture device.

9. The method of claim 8, further comprising:
    receiving, by a fourth module, write requests to the snapshot storage device;
    caching, by the fourth module, data blocks written to the snapshot storage device by the host; and
    writing, by the fourth module, data blocks written to the snapshot storage device by the host to the snapshot storage device.

10. The network device of claim 1, further comprising a fourth module for receiving write requests to the snapshot storage device which caches data blocks written to the snapshot storage device by the host and writes data blocks written to the snapshot storage device by the host to the snapshot storage device.

11. A method performed by a network device, the method comprising:
    creating, by a first module of the network device, a snapshot of data stored on an original storage device accessible by the network device;
    receiving, by a second module of the network device, a read request received from a host accessible by the network device; and
    responding, by the second module, to said request with response data that includes original storage device data if unmodified data is requested and with snapshot storage device data if modified data is requested.

12. The method of claim 11, further comprising including, by the second module in the response data which includes a request for unmodified data, cached storage device data stored in a cache memory and corresponding to the original storage device data if the corresponding original storage device data is stored in the cache memory and original storage device data if the corresponding original storage device data is not stored in the cache memory.

13. The method of claim 12, further comprising:
determining, by the second module, if sequential read request operations are being performed;
prefetching, by the second module, data if sequential read request operations are being performed; and
storing in the cache, by the second module, the prefetched data.

14. The method of claim 11, further comprising including, by the second module in the response data which includes a request for modified data, cached snapshot data stored in a cache memory and corresponding to the snapshot storage device data if the corresponding snapshot storage device data is stored in the cache memory and snapshot storage device data if the corresponding snapshot storage device data is not stored in the cache memory.

15. The method of claim 14, further comprising including, by the second module in the response data which includes a request for unmodified data, cached storage device data stored in a cache memory and corresponding to the original storage device data if the corresponding original storage device data is stored in the cache memory and original storage device data if the corresponding original storage device data is not stored in the cache memory.

16. The method of claim 15, further comprising:
determining, by the second module, if sequential read request operations are being performed;
prefetching, by the second module, data if sequential read request operations are being performed; and
storing in the cache, by the second module, the prefetched data.

17. The method of claim 11, further comprising receiving, by the first module, a command from a service interface device and creating, by the first module, the snapshot in response to the command.

18. The method of claim 11, further comprising caching, by a third module, data written to said original storage device as provided to the network device by a write capture device.

* * * * *